United States Patent
Naumiec et al.

(10) Patent No.: US 6,813,925 B2
(45) Date of Patent: Nov. 9, 2004

(54) CALIBRATION METHOD AND SYSTEM FOR A DYNAMIC COMBUSTOR SENSOR

(75) Inventors: Robert Naumiec, Clifton Park, NY (US); Walter Smith, Ballston Spa, NY (US); Fei Han, Schenectady, NY (US); Eamon Gleeson, Atlanta, GA (US); Robert A. Hedeen, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 297 days.

(21) Appl. No.: 10/161,702

(22) Filed: Jun. 5, 2002

(65) Prior Publication Data

US 2003/0226392 A1 Dec. 11, 2003

(51) Int. Cl.[7] ............................................. G01L 27/00
(52) U.S. Cl. ........................................................ 73/1.66
(58) Field of Search ............................. 73/1.57, 1.58, 73/1.59, 1.63, 1.64, 1.66, 1.67, 865.6

(56) References Cited

U.S. PATENT DOCUMENTS

| | | | | |
|---|---|---|---|---|
| 3,045,470 A | * | 7/1962 | Crandell et al. | ............. 73/1.64 |
| 3,264,861 A | * | 8/1966 | Miles | ........................ 73/1.66 |
| 3,273,376 A | * | 9/1966 | Aronson et al. | ............. 73/1.66 |
| 3,590,626 A | | 7/1971 | Hugli | |
| 3,868,844 A | | 3/1975 | Klein | |
| 4,499,751 A | | 2/1985 | Riggs | |
| 4,506,539 A | * | 3/1985 | Hessler | ........................ 73/1.66 |
| 4,698,997 A | * | 10/1987 | Hess et al. | .................... 73/1.64 |
| 5,257,640 A | * | 11/1993 | Delajoud | ....................... 137/14 |
| 5,902,925 A | * | 5/1999 | Crispie et al. | ................ 73/1.88 |

FOREIGN PATENT DOCUMENTS

| | | |
|---|---|---|
| FR | 2 449 217 | 9/1980 |
| RU | 712707 | 1/1980 |
| RU | 750301 | 7/1980 |
| RU | 1747970 | 7/1992 |

OTHER PUBLICATIONS

European Search Report dated Sep. 16, 2003.

* cited by examiner

Primary Examiner—Robert Raevis
(74) Attorney, Agent, or Firm—Nixon & Vanderhye P.C.

(57) ABSTRACT

In one embodiment, the invention is a pressure sensor calibration system comprising a pressure chamber in fluid communication with a pressure sensor to be calibrated, the chamber is pressurized to a static pressure level. An oscillating surface on a wall of the chamber imparts a rapid pressure fluctuation in the static pressure level of the chamber. These rapid pressure fluctuations in a high-static pressure level chamber are used to calibrate the pressure sensor.

26 Claims, 7 Drawing Sheets

CALIBRATION METHOD AND SYSTEM FOR A DYNAMIC COMBUSTOR SENSOR

FIELD OF THE INVENTION

The field of the invention relates to a calibration system for combustion sensors.

BACKGROUND OF THE INVENTION

Within the combustion section in a gas turbine, a violent combustion process occurs that generates combustion gases that drive the turbine. Extreme temperatures and pressures occur during combustion as compressed air and fuel mix together and combust. The temperatures and pressures in the combustion chamber can fluctuate rapidly and vary over extreme ranges.

Monitoring the combustion reaction is helpful in controlling the fuel flow to the combustor and the operating mode of the gas turbine. To monitor the combustion reaction, temperature and pressure sensors are placed within the combustion and turbine sections of a gas turbine. These sensors monitor the combustion process and the combustion gases. The sensors generate signals that are indicative of the temperature or pressure of the combustion gases. The signals from the sensors are used by the computer controller for the gas turbine to set the operational conditions for the gas turbine, including fuel flow and compressor inlet vane positions. In addition, the sensor measurements are used to ensure that the temperatures and pressures within the combustor and turbine sections, do not exceed threshold pressure and temperature conditions.

To ensure that accurate pressure and temperature measurements are made, the sensors within the combustion section and turbine section should be properly calibrated so that they provide accurate measurements of temperature and pressure. It is generally desirable to calibrate and test temperature and pressure sensors under conditions comparable to those in which the sensors are intended to operate. Sensors in the combustion section of a gas turbine operate in conditions of extreme temperature and pressure, and should accurately measure rapid fluctuations in pressure. There is a long-felt need to calibrate sensors in conditions which replicate those in the combustor of a gas turbine. Similarly, there is a long-felt need for calibration systems for combustor sensors that replicate the temperature and pressure conditions in the combustor section of a gas turbine.

BRIEF DESCRIPTION OF THE INVENTION

In one embodiment, the invention is a pressure sensor calibration system comprising a pressure chamber in fluid communication with a pressure sensor to be calibrated, the chamber is pressurized to a static pressure level. An oscillating surface on a wall of the chamber imparts a rapid pressure fluctuation in the static pressure level of the chamber. These rapid pressure fluctuations in a high-static pressure level chamber are used to calibrate the pressure sensor. The calibration system may be used to calibrate dynamic sensors at gas turbine working conditions, such as static pressures greater than 200 psi (14 kilo/mm) and temperatures greater than 700° F. (370° C.).

In a second embodiment, the invention is pressure sensor calibration system comprising a probe holder having a mount for a pressure sensor to be calibrated, wherein the holder has an aperture in fluid communication with a pressure generator, and the pressure generator has a pressure chamber coupled to a steady source of high pressure gas to pressurize the chamber to a static pressure level. The pressure chamber also has an oscillating surface which dynamically varies the static pressure level in the chamber, and the oscillating surface is oscillated by a shaker device.

BRIEF DESCRIPTION OF THE DRAWINGS

The embodiments of the present invention are shown in the attached drawings which are.

DETAILED DESCRIPTION OF THE INVENTION

Figure 1:
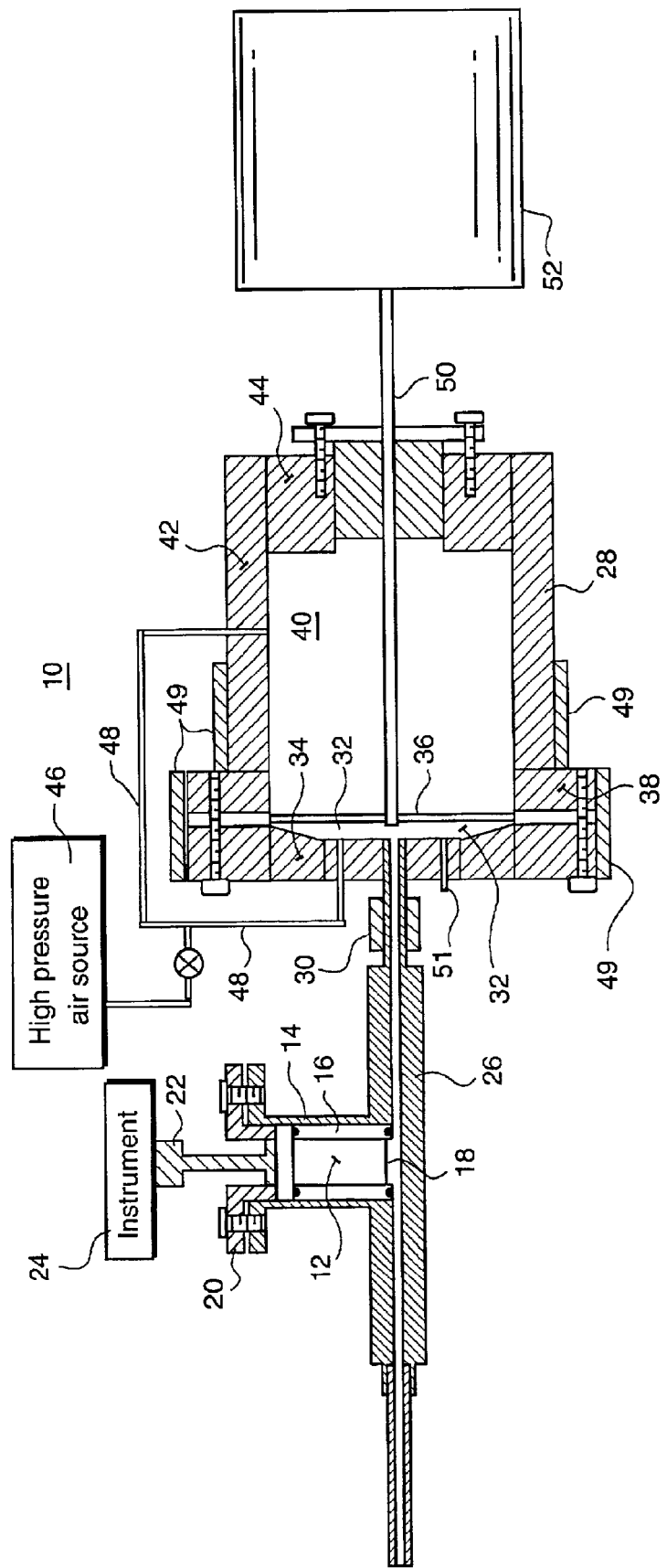
FIG. 1 is a schematic diagram of a first embodiment of a calibration system for testing dynamic pressure transducers.

FIG. 1 is a schematic illustration of a calibration testing system 10 for a dynamic pressure probe sensor 12. The testing system 10 includes a probe holder 14 that is a mount for the dynamic pressure probe 12 during calibration. The probe holder 14 may include a cylindrical chamber 16 into which the probe holder is inserted. The probe holder 14 may also be secured by a holder mount 20. Further, an optical or electrical signal wire connection 22 is provided to connect the probe 12 to conventional calibration instruments 24, typically used to calibrate sensor transducer probes.

The probe 12 is held within the cylinder 16 such that the transducer head of the probe 18, which senses external pressure conditions, is exposed to a pressurized gas or chamber conduit 26. The insulated fluid conduit 26 is coupled to a dynamic pressure generator 28 that produces rapidly-oscillating high-pressure gases at controlled temperatures. These temperature-controlled, oscillating, high-pressure gases are applied to the transducer head 18 of the probe 12. The conduit or chamber 26 may be thermally insulated and include an electrical heating band 30. The heating band may elevate the temperature of the conduit and the fluid passing through the conduit to temperatures simulating the combustion temperatures in a combustor or turbine section of a gas turbine. The conduit 26 is open to a first chamber 32 of the dynamic pressure generator 28. The first chamber is defined by the front wall 34 of the housing of the pressure generator and by a movable diaphragm 36 that is mounted within the housing of the pressure generator 28. The height of the first chamber may be 0.35 inches (0.9 cm). The diaphragm is mounted within the housing 28 by a diaphragm mount 38 that supports the diaphragm across the interior chamber 32, 40 of the housing. A second interior chamber 40 of the generator 28 is defined by the side walls 42 and rear wall 44 of the housing and by the diaphragm 36.

The first and second chambers 32, 40 housed within the pressure generator 28 are maintained under high gas pressure, such as 200 lbs. per square inch (psi) static pressure, by a high pressure gas source 46 that is coupled via conduits 48 to both the first and second chambers 32, 40.

The steady-state (now oscillating) pressure in the first and second chambers is maintained at a relatively-high static pressure level. The steady, average pressures (static pressure) in each of the fist and second chambers 32, 40 are balanced and should be relatively uniform. To promote a static-pressure balance, the conduits 48 supply steady, high-pressure gas, e.g., air, to both chambers 32, 40. The first and second chambers 32, 40 may be heated by electrical heater bands 49 that wrap around the side wall 42 of the generator 28. A thermocouple 51 inserted into an aperture in the front wall 34 monitors the gas temperature in the first chamber 32.

A dynamic pressure oscillation is imparted by a diaphragm 36 to the high-static pressure in the first chamber 32 of the pressure generator. The diaphragm 36 moves reciprocally within the two chambers 32, 40 of the dynamic pressure generator 28. The diaphragm may have a circular area of 6.8 inches$^3$ ($1.1 \times 10^{-4}$ m$^3$). The reciprocal movement of the diaphragm creates a pressure oscillation in the first chamber 32. The pressure oscillation can reach very high level, such as 10 psi or more at an oscillating frequency below 1000 Hz. The oscillating frequency of the diaphragm 36 and the pressure fluctuation in the first volume 32 may be varied over a range of frequencies that typically occur in the combustion gases of a gas turbine combustor. The oscillating frequency range may be from 50 Hz to 3,200 Hz.

The oscillation of the diaphragm causes the gas pressure within the first chamber 32 to fluctuate at the oscillation frequency of the diaphragm, while the gas pressure is maintained in the chamber 32 at a high static pressure, e.g., 200 psi. Because the chamber of the first volume 32 is relatively small, e.g., 1.8 inches$^3$ ($2.5 \times 10^{-5}$ m$^3$), the dynamic pressure change in the first chamber is relatively great. The dynamic pressure variance in the first chamber is conveyed via the conduit 26 to the transducer head 18 of the probe 12.

The oscillating dynamic pressure is in addition to the high average steady pressure, e.g., 200 psi, that is in the first chamber 32 of the pressure generator 28. The first chamber 32 provides a gas source having a high steady (static) pressure and a high-frequency dynamic pressure which, when heated 30, 49 simulates the conditions in a combustion section or turbine of a gas turbine. These pressure and temperature conditions are sensed by the sensor transducer probe 12 which is open to the pressurized and heated fluid in the conduit 26.

The diaphragm 36 is mechanically coupled via a shaft 50 to a shaker device 52. The shaker device applies a reciprocating motion to the shaft 50 at a range of frequencies, e.g., 50 to 3,200 Hz, at which the dynamic pressure is to be oscillated in the first chamber 32 of the pressure generator 28. The shaft 50 reciprocally moves the diaphragm 36 so as to create the dynamic pressure frequency in the first chamber 32. The reciprocating movement of the shaft and diaphragm may be $^{35}/_{1000}$ of an inch (0.01 mm). The shaker device and shaft may be implemented by a sound speaker mounted in the second pressure chamber 40. The speaker broadcasts sound vibrations into the second chamber and against the diaphragm at various frequencies to cause the diaphragm to vibrate and impart a dynamic frequency component to the static pressure in the first pressure chamber 32.

Figure 2:
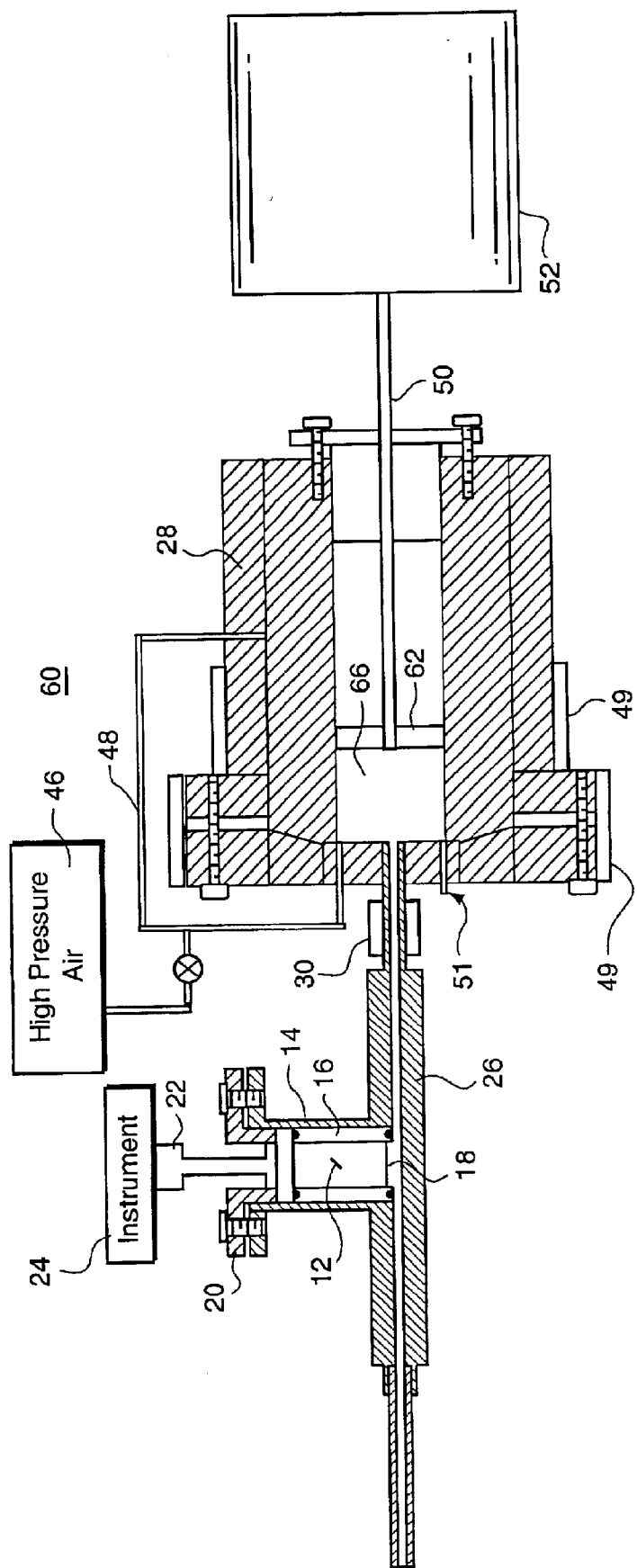
FIG. 2 is a schematic diagram of a second embodiment of a calibration system.

FIG. 2 shows a second embodiment of a calibration system 60. As in the first embodiment, a transducer pressure probe 12 to be tested is mounted in a probe holder 14 and coupled to an instrument 24 via a wired (or wireless) link 22. A shaker 52 is coupled via a shaft 50 to a piston 62 (which may also be a diaphragm) to a pressure generator 64. The pressure generator 64 has a pressure chamber 66. The first chamber is maintained at a high static pressure, e.g., 200 psi, and has applied to it a dynamic oscillating pressure, e.g., 1 psi (rms) over a frequency range of 50 to 1,000 Hz and 0.1 psi (rms) from 1,000 Hz to 5,000 Hz. The piston oscillates at high frequencies, such as at acoustic frequency levels, under the reciprocating force applied by the shaker.

Figure 3:
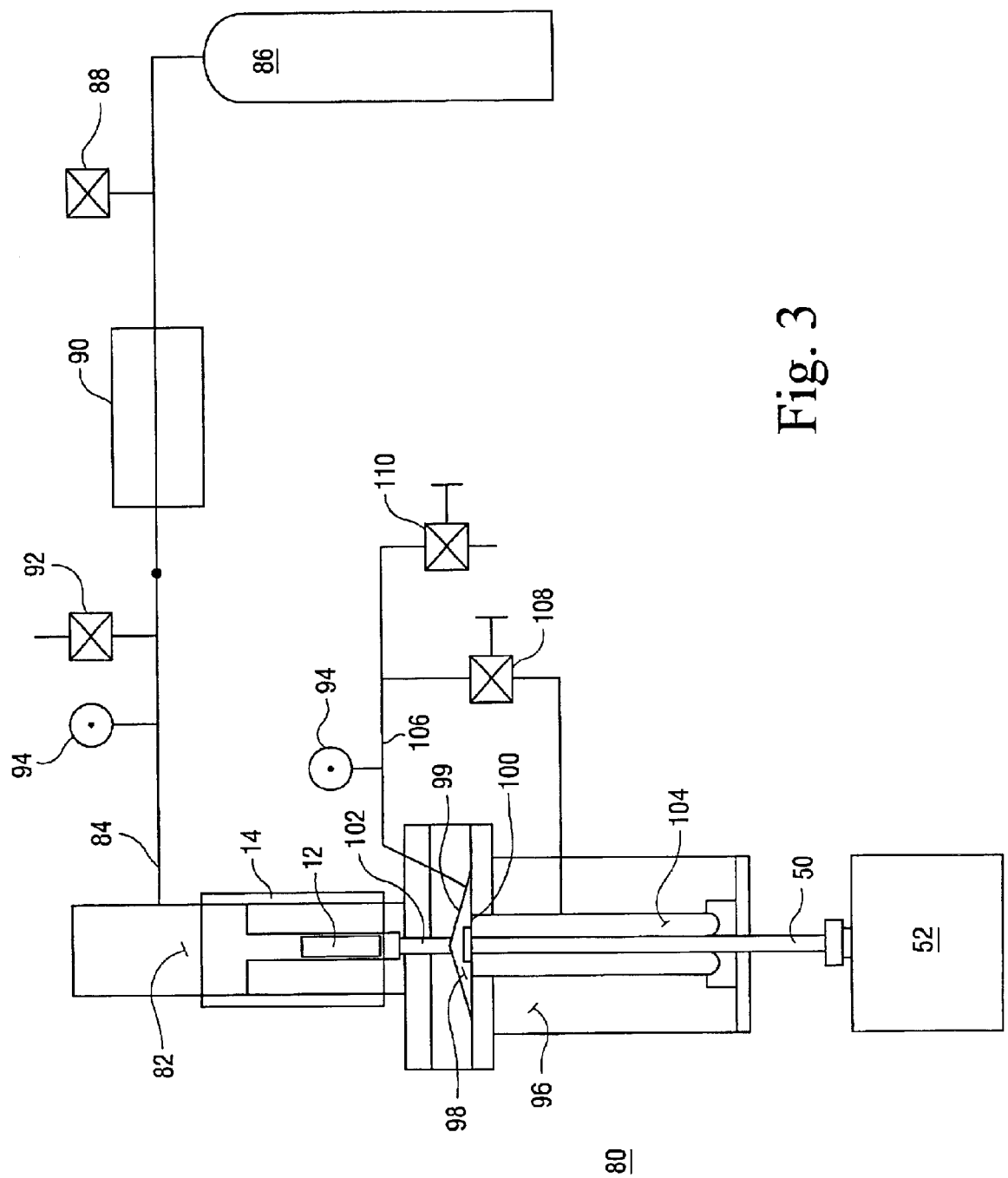
FIG. 3 is a schematic diagram of a third embodiment of a calibration system.

FIG. 3 is a schematic diagram of a third embodiment of a pressure-sensitive probe calibration system 80. The probe 12 is held in a cylindrical probe holder 14. A chamber 82 within the holder 14 is pressurized via a pressure line 84 that is coupled to a source of high-pressure air 86. The chamber 82 provides a source of pressurized gas for the probe 12, which is useful for probes having flow passages for pressurized gases. The pressure line 84 may include a pressure regulator 88 to control the pressure applied to the chamber 82 of the holder and a heater 90 to control the heat of the gas provided to the chamber 82. In addition, a pressure safety relief valve 92 and pressure sensor 94 in the conduit 84 provides a means to monitor the pressure and relieve excessive pressures in the conduit and chamber 82 of the holder. The gas conditions in the chamber 82 of the holder may be, for example, 240 psi and a temperature of 700° F. The pressurized chamber 82 is used to supply static pressurized gas to the pressure generator 96, and in particular to conduit 102 and first chamber 98.

The pressure generator 96 includes a first chamber 98 that is pressurized to a high static pressure level, e.g., 200 psi, and has an oscillating dynamic pressure applied by a diaphragm 100. The first chamber 98 is a conical volume having as its base the diaphragm and as its conical upper surface a recess 99 in the pressure generator. The conical chamber 98 has at an apex a conduit 102 that allows pressurized gas in the first chamber 98 to flow to the transducer head of the probe 12. The first chamber 98 and conduit 102 are pressurized from the high-pressure air provided from the pressure source 86 that flows through conduit 84 and chamber 82 of the probe holder. Pressurized gas flows from the chamber 82 around the probe 12, through the conduit 102 and into the first chamber 98.

Behind the diaphragm 100 is a second chamber 104 that may have a cylindrical volume that extends along the length of the shaker shaft 50. The second chamber 104 is maintained at the same steady pressure as is the first chamber 98 via a pressure equalization conduit 106 that provides a fluid communication path between the first chamber 98 and the second volume 104. A pressure sensor 94 may be in the path as well as a pressure equalization 108 that, when opened, allows the first and second chambers 98, 104 to be equalized in pressure. In addition, a release dump valve 110 may be used to bleed gas pressure from the chambers.

Figure 4:
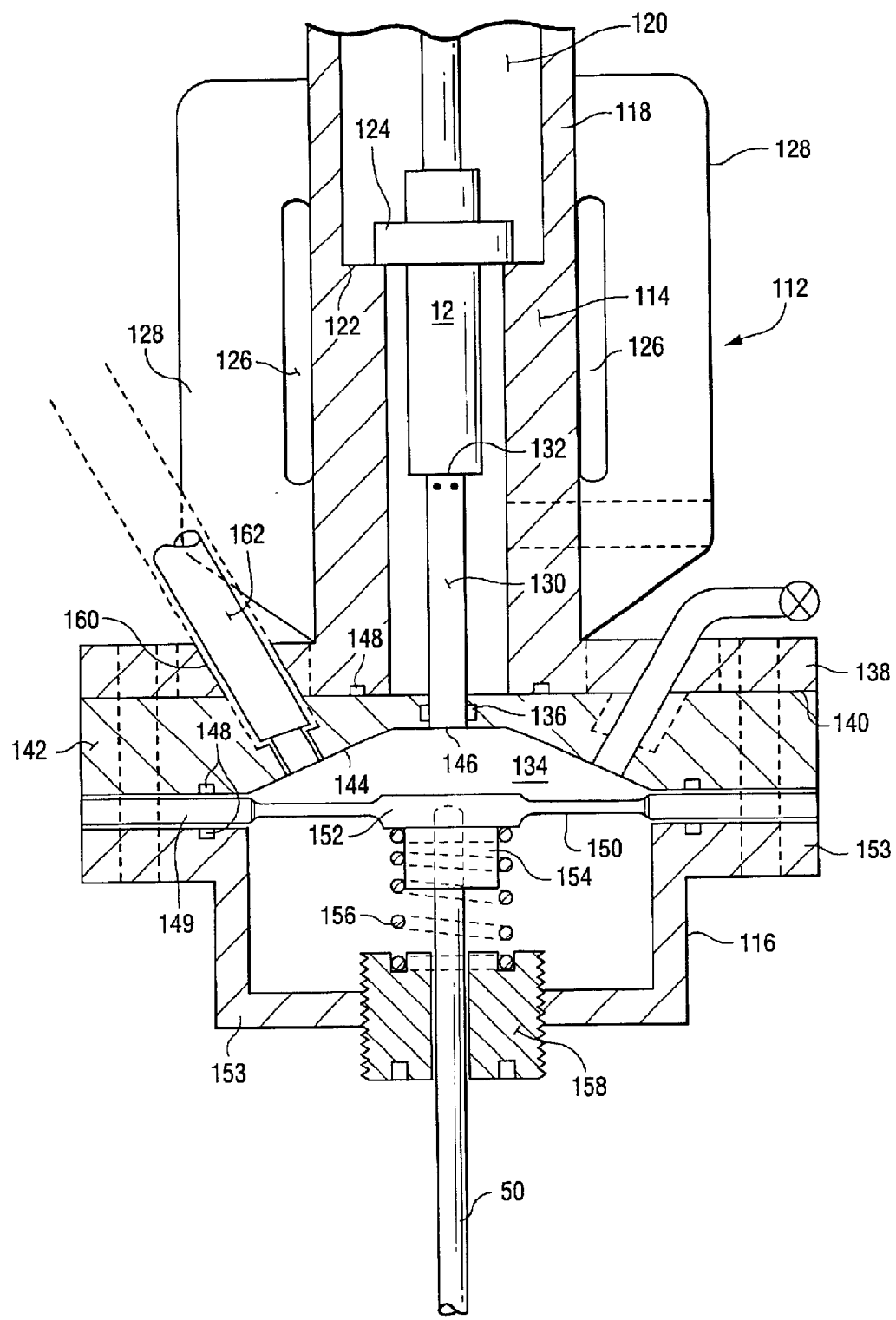
FIG. 4 is an enlarged cross-sectional diagram of a probe calibration device.

FIG. 4 is an enlarged view of a third embodiment 112 of a pressure transducer 12, probe holder 114 and a pressure generator 116. The holder 114 may have a cylindrical casing 118 having a hollow cylindrical chamber 120 that receives the probe 12 to be tested and pressurization gas from a gas source, such as pressure gas source 86 shown in FIG. 3. The casing 118 may include an internal annular lip 122 to support a collar on a probe holder mount 124. The probe 12 is coupled to the probe holder mount 124 and both are inserted into the chamber 120 of the probe holder 114. The probe holder may be heated with an electrical heating band 126 that surrounds the probe holder adjacent the probe 12. The probe may be encased in an insulative sleeve 128.

A hollow conduit 130 extends between the probe transducer head 132 and a first chamber 134 of a pressure generator 116. The conduit 130 may be formed by a tube which extends from the transducer head 132 to the first chamber 134. Appropriate fluid seals 136 may be used to seal the tube 130 to the housing for the pressure generator. The probe holder 114 includes a flange 138 that abuts against and is bolted to an end face surface 140 of the pressure generator 116.

The pressure generator includes a thick plate 142 whose front face 140 is the end of the pressure generator. On an opposite side, the thick plate includes a conical recess 144 that forms one side of the first chamber 134 of the pressure generator. At the apex of the recess 144 is an aperture 146 that is adjacent the conduit 130 and that leads to the sensor transducer 12 to be calibrated. An O-ring seal 136 within the plate 142 provides a seal between the conduit 130 and the plate. Other fluid seals 148 ensure that the plate 142 seals against the flange 138 of the probe holder. In addition, a pair of fluid seals 148 engage an outer annular flange 149 on the diaphragm 150. The diaphragm flange is sandwiched between the plate 142 and lower housing 153 of the pressure generator 116.

A center disk 152 of the diaphragm provides an attachment mount for the shaft 50 of the shaker. A collar 154 attaches the shaft to the disk 152 of the diaphragm. In addition, a spring 156 is between the disk 152 of the diaphragm. A threaded bushing 158 fits into the lower housing 153 of the pressure generator. The spring 156 applies a pre-load force to the diaphragm to ensure that the diaphragm is biased against the high pressure, e.g., 200 psi, in the first chamber 134. The spring 156 avoids the need for equalizing the pressure on the side of the diaphragm opposite to the first chamber 134.

By way of example, the first chamber 134 of the pressure generator may have a volume of 1.8 inches$^3$ (2.5×10$^{-5}$ m$^3$) and the circular diaphragm area may be 6.8 inches$^2$ adjacent the first volume 134. The average height between the center disk 152 of the diaphragm and the apex of the conical recess 144 may be 0.35 inches. The first chamber 134 is a relatively-small volume such that the oscillation applied by the diaphragm, although slight, fluctuates the volume of the first chamber by approximately 1% of the total volume of the chamber. In this example, the diaphragm may move reciprocally by $3.5/1000$ of an inch. Accordingly, the diaphragm should be formed of a flexible metal or rubber sheet.

A reference probe aperture 160 is provided in the flange 138 of the probe holder. The reference probe 162 may measure dynamic pressure in the first chamber 134 simultaneously with the probe 12 being tested. The reference probe 162 has known sensing characteristics. The output signals from the reference probe 162 may be compared with the output signals provided from probe 12 being calibrated (see FIG. 7).

Figure 5:
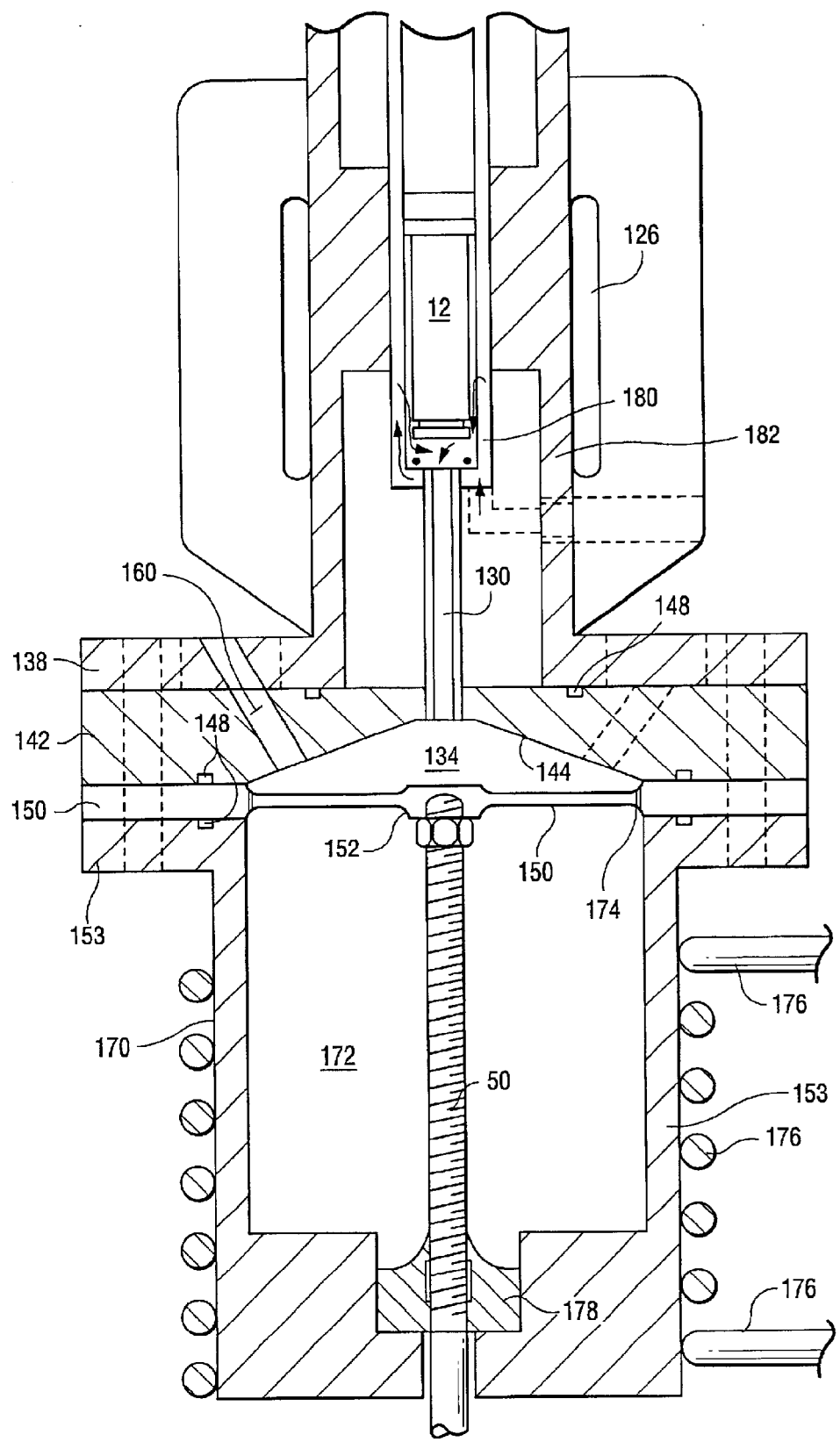
FIG. 5 is an enlarged close-up, cross-sectional diagram of a third embodiment of a probe calibration device.

Unlike the pressure generator shown in FIG. 4, the pressure generator 170 (FIG. 5) has a second pressure chamber 172 behind the diaphragm 150. Chamber 172 is pressurized to substantially the same static pressure as is the pressure in the first chamber 134. The diaphragm has at least one capillary pressure vent 174 that allows gas under high pressure from first chamber 134 to flow to the second chamber 172. The capillary 174 is a relatively-small passage, such that pressure fluctuations in the first chamber 134 due to the oscillation of the diaphragm 150 do not pass through the capillary openings 174 into the second chamber 172.

The pressure generator 173 may be cooled by a water coolant jacket 176 that coils around the outside of the pressure generator. A lip seal 178 provides a collar between the reciprocating shaft 50 and the housing 153 of the pressure generator 170. The lip seal prevents the pressurized gas in the second chamber 172 from leaking out along the shaker shaft 50 to the atmosphere.

Air pressure is provided to the first volume 134 from a chamber 180 in the probe holder 182. The chamber is a cylindrical volume around the probe 12. Pressurized gas enters the chamber via inlet 184 and flows through holes in the probe to the conduit 130. The pressure inlet port 184 is coupled to a source of pressurized air and pressurizes the chamber 180.

Figure 6:
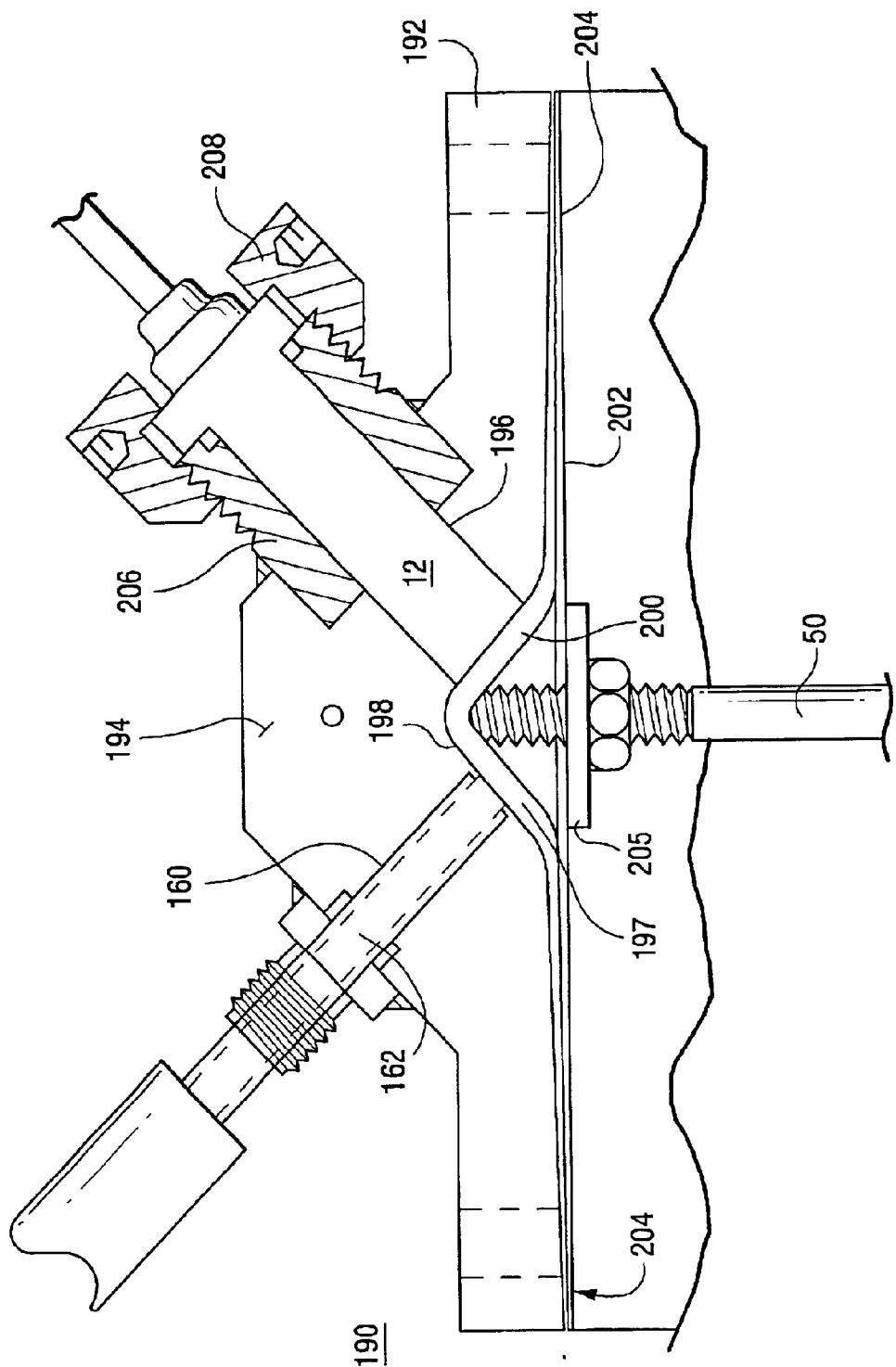
FIG. 6 is an enlarged cross-sectional diagram of a fourth embodiment of a probe calibration device.

FIG. 6 shows a further embodiment of a combined pressure generator and probe holder 190. The probe holder includes a plate 192 having a raised conical center section 194. The conical section 194 on opposite sides has apertures 160 for a reference probe 162 (or second probe to be tested) and an aperture 196 for the test probe 12. The apertures 196 and 160 extend to a first chamber 197 which is a conical volume defined by an upper recess 198 in the probe holder 192 and a conical cap 200 on the diaphragm 202. The conical chamber 197 may be a relatively-narrow and small gap of $10/1000$ to $5/1000$ of an inch (0.25 to 0.1 mm) between the wall 198 and conical cap 200. Because of the small chamber 197, the oscillation of the diaphragm and conical cap 200 generate fairly significant pressure fluctuations which are sensed and measured by the test probe 12 and reference probe 162. The first chamber 197 is pressurized from a high-pressure source via pressure conduit (not shown) extending through the apex of the conical 194 probe holder.

A peripheral flange of the diaphragm 202 is sandwiched between the plate 192 of the probe holder and the end face 204 of the pressure generator. The pressure generator is shown in partial form in FIG. 6, and in its complete form may include a spring or pressurized chamber behind the diaphragm, as shown in other embodiments of the pressure generator. For example, the embodiment shown in FIG. 6 may be configured as a modification to the system 10 shown in FIG. 1. The conical cap 200 may be attached to the end of the shaker shaft 50 by a screw, washer and bolt connection. The washer 205 may be used to hold the diaphragm 202 against the conical cap 200, and the bolt may secure the washer to the diaphragm and conical cap. The probe 12 may slide into a bushing 206 mounted in the aperture 196 of the probe holder 192. A collar 208 may secure the probe 12 within the bushing 206.

Figure 7:
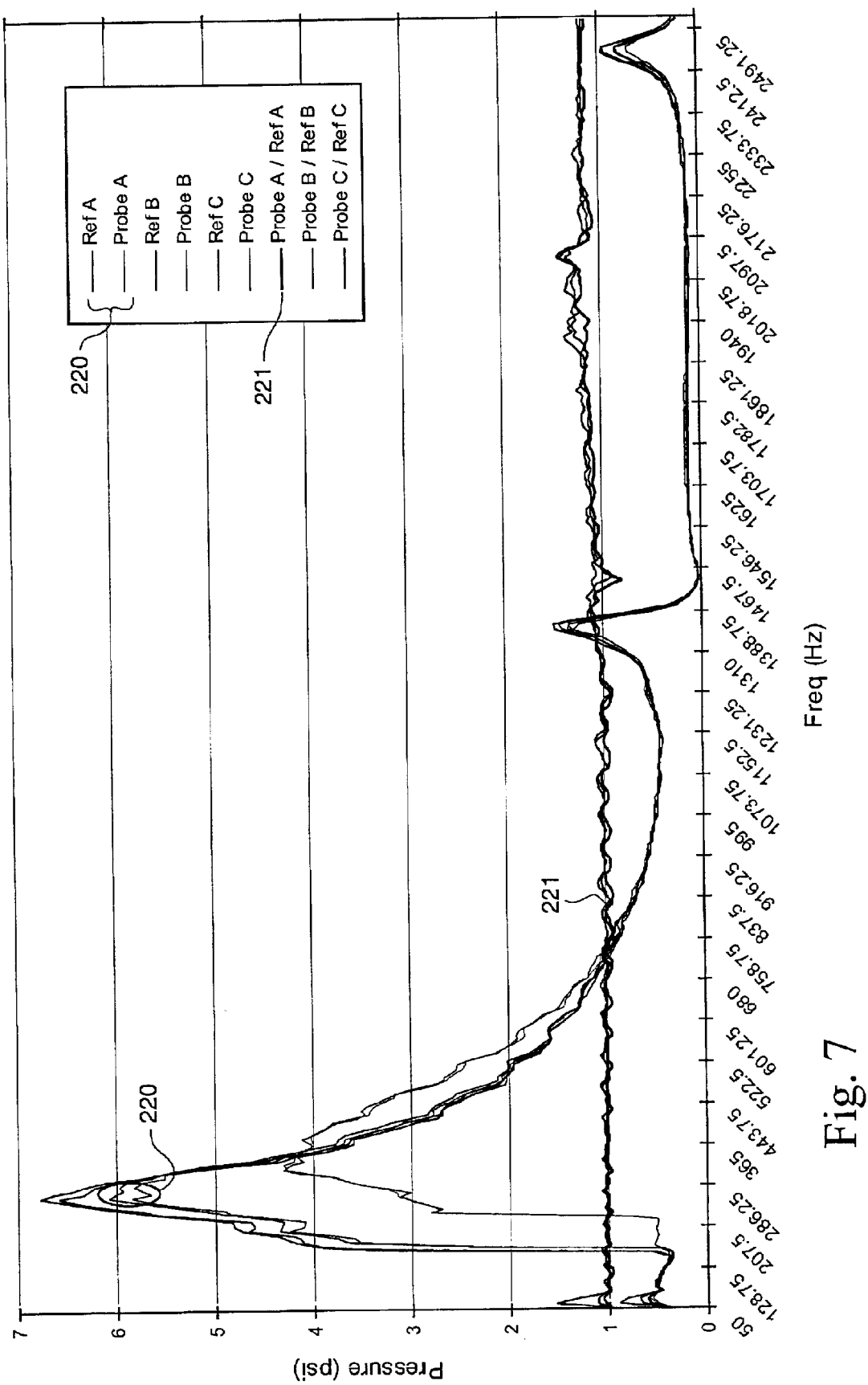
FIG. 7 is a chart showing testing data of various dynamic pressure probes using a calibration system described herein.

FIG. 7 is a chart showing exemplary sensor reading test results from a probe calibration system consistent with the disclosure here. The chart compares the pressure (psi) measurements made by reference probes and test probes over a range of dynamic frequencies extending from 50 Hz to 2,500 Hz. Each of the three tests was conducted with a test probe paired with a reference probe. The first pair of probes (reference probe A and probe A) are shown by the pair of lines marked as 220. The signal lines 220 for the test and reference probes are nearly identical. The ratio of the signal value generated by the test probe and the reference probe is close to one (see right-hand side of chart) which signifies that the reference probe and the test probe A generated substantially the same signals representing the pressure and temperature conditions in the first chamber of the pressure generator. Similar results are shown for reference probe B and probe B, and reference probe C and probe C. Based on the charted comparative sensor signals, a determination may be made as to whether each probe (A, B or C) generates signals that accurately depict pressure or temperature conditions. Similarly, the charted sensor signals provide information that can be used to adjust signals from each probe (A, B and C) so that the signals accurately report actual pressure or temperature conditions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A sensor calibration system comprising:
a pressure chamber in fluid communication with a sensor to be calibrated, said chamber pressurized to a static pressure level;
an oscillating surface on a wall of said chamber, said oscillating surface imparts a rapid pressure fluctuation in the static pressure level of said chamber, and
a mechanical shaker coupled to the oscillating surface and applying a reciprocating motion to the surface.

2. A sensor calibration system as in claim 1 wherein the shaker applies the reciprocating motion at a selected frequency in a range of about 50 hertz (Hz) to about 3,200 Hz.

3. A method as in claim 1 further comprising a reciprocating piston in the pressure chamber wherein a front surface of the piston is the oscillating surface and the shaker applies the reciprocating motion to the piston.

4. A sensor calibration system as in claim 1 wherein said oscillating surface further comprises a conical section facing said chamber.

5. A sensor calibration system as in claim 1 wherein said oscillating surface further comprises a conical section facing said chamber, and said conical section having a first surface adjacent a probe sensing surface position in the chamber and a second surface adjacent a calibration probe sensing surface position.

6. A sensor calibration system as in claim 1 wherein the oscillating surface is a diaphragm.

7. A sensor calibration system as in claim 1 wherein said chamber is maintained at a static pressure of at least 200 psi.

8. A sensor calibration system as in claim 1 wherein said pressure chamber has a volume no greater than 1.8 inches cubed.

9. A sensor calibration system as in claim 1 wherein said chamber is a first chamber, and the oscillating surface is a diaphragm and a second pressure chamber is on a side of the diaphragm opposite to the first chamber, and the first chamber and the second pressure chamber have equalized static pressure, wherein the mechanical shaker further comprises a shaft extending through the second chamber and is attached to the diaphragm.

10. A sensor calibration system as in claim 9 wherein a speaker in the second pressure chamber emits vibrations that cause the diaphragm to vibrate.

11. A pressure sensor calibration system comprising:
a probe holder having a mount for a pressure sensor to be calibrated, said holder having an aperture in fluid communication with a pressure generator
said pressure generator having a pressure chamber coupled to a steady source of high pressure gas to pressurize the chamber to a static pressure level,
said pressure chamber having an oscillating surface which dynamically varies the static pressure level in the chamber, and
said oscillating surface is oscillated by a mechanical shaker external to the pressure chamber and comprising reciprocating shaker coupling between the reciprocating shaker and the oscillating surface, wherein the coupling applies a reciprocating motion to the oscillate the surface.

12. A sensor calibration system as in claim 11 wherein the shaker applies the reciprocating motion at a selected frequency in a range of about 50 hertz (Hz) to about 3,200 Hz.

13. A method as in claim 11 further comprising a reciprocating piston in the pressure chamber wherein a front surface of the piston is the oscillating surface and the coupling is a piston rod between the piston and shaker.

14. A calibration system as in claim 11 wherein the oscillating surface is a diaphragm.

15. A calibration system as in claim 11 wherein said pressure chamber is maintained at a static pressure of at least 200 psi.

16. A calibration system as in claim 11 wherein said pressure chamber has a volume no greater than 1.8 inches cubed.

17. A calibration system as in claim 11 wherein said pressure chamber is a first chamber, and the oscillating surface is a diaphragm and a second pressure chamber is on a side of the diaphragm opposite to the first pressure chamber, and the first pressure chamber and the second pressure chamber have equalized static pressure, and wherein said coupling comprises a shaft extending through the second pressure chamber to the diaphragm.

18. A method for calibrating a sensor using a calibration device having a probe holder and pressure generator comprising:
a. monitoring the sensor to be calibrated in the probe holder such that the transducer head of the sensor is in fluid communication with a pressure chamber in the pressure generator;
b. pressurizing the pressure chamber to a static pressure level,
c. mechanically vibrating a surface of the pressure chamber to generate a dynamic pressure fluctuation on the pressure level in the pressure chamber, whereby a mechanical shaker applies reciprocal motion to the surface,
d. sensing the pressure level in the pressure chamber, and
e. generating a signal by the sensor representing the dynamic pressure fluctuation.

19. A method as in claim 18 wherein the shaker applies the reciprocating motion at a selected frequency in a range of about 50 hertz (Hz) to about 3,200 Hz.

20. A method as in claim 18 wherein the pressure chamber is maintained at a static pressure of at least 200 psi.

21. A method as in claim 18 wherein the vibration is provided by a diaphragm.

22. A sensor calibration system comprising:
a pressure chamber in fluid communication with a sensor to be calibrated, said chamber pressurized to a static pressure level;
an oscillating surface on a wall of said chamber, said oscillating surface imparts a rapid pressure fluctuation in the static pressure level of said chamber, and
wherein said chamber is in thermal communication with a heat source, and said heat source heats the chamber to at least 700° F.

23. A calibration system comprising:
a probe holder having a mount for a pressure sensor to be calibrated, said holder having an aperture in fluid communication with a pressure generator
said pressure generator having a pressure chamber coupled to a steady source of high pressure gas to pressurize the chamber to a static pressure level,
said pressure chamber having an oscillating surface which dynamically varies the static pressure level in the chamber, and said oscillating surface is oscillated by a shaker device
wherein said pressure chamber is in thermal communication with a heat source, and said heat source heats the pressure chamber to at least 700° F.

24. A method using a calibration device having a probe holder and pressure generator comprising:
  a. monitoring the sensor to be calibrated in the probe holder such that the transducer head of the sensor is in fluid communication with a pressure chamberin the pressure generator;
  b. pressurizing the pressure chamber to a static pressure level,
  c. vibrating a surface of the pressure chamber to generate a dynamic pressure fluctuation on the pressure level in the pressure chamber,
  d. sensing the pressure level in the pressure chamber, and
  e. generating a signal by the sensor representing the dynamic pressure fluctuation,
  wherein the pressure chamber is heated to at least 700° F.

25. A pressure sensor calibration system comprising:
  a probe holder further comprising a mount for a pressure sensor to be calibrated and a sensor chamber adjacent the mount, said sensor chamber having an inlet aperture to receive a high pressure gas from a steady source of the high pressure gas to pressurize the sensor chamber, and
  a pressure chamber having an oscillating surface to dynamically vary the gas pressure level in the pressure chamber, wherein a passage between said pressure chamber and said sensor chamber transmits dynamic pressure variations from the pressure chamber to the sensor chamber and a mechanical shaker is coupled to oscillate said oscillating surface.

26. A pressure sensor calibration system as in claim 25 further comprising a gas discharge port in said pressure chamber through which flows the high pressure air from the sensor chamber via the pressure chamber.

* * * * *